US006871964B2

United States Patent
Peng

(10) Patent No.: US 6,871,964 B2
(45) Date of Patent: Mar. 29, 2005

(54) PROJECTOR WITH A FLEXIBLE SHEET TO REDUCE ELECTROMAGNETIC INTERFERENCE (EMI)

(75) Inventor: Jung-Hsing Peng, Jungil (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 10/780,009

(22) Filed: Feb. 17, 2004

(65) Prior Publication Data

US 2004/0174503 A1 Sep. 9, 2004

(30) Foreign Application Priority Data

Mar. 6, 2003 (TW) .................................. 92203403 U

(51) Int. Cl.[7] .............................................. G03B 21/14
(52) U.S. Cl. ...................................................... 353/119
(58) Field of Search ................................ 353/119, 122; 349/5, 7, 8

(56) References Cited

U.S. PATENT DOCUMENTS

| 6,637,895 | B2 | * | 10/2003 | Fujimori et al. | ............. 353/119 |
| 2002/0080334 | A1 | * | 6/2002 | Suzuki et al. | ................. 353/52 |
| 2004/0041985 | A1 | * | 3/2004 | Kimura et al. | ................. 353/70 |
| 2004/0189951 | A1 | * | 9/2004 | Ogawa | ........................ 353/20 |
| 2004/0218151 | A1 | * | 11/2004 | Ito et al. | ........................ 353/57 |
| 2004/0239897 | A1 | * | 12/2004 | Ogawa et al. | ............... 353/119 |

* cited by examiner

Primary Examiner—Christopher Mahoney
(74) Attorney, Agent, or Firm—Quintero Law Office

(57) ABSTRACT

A projector with a flexible sheet to reduce electromagnetic interference (EMI). The projector has an upper case, a lower case, an optical engine and at least a flexible sheet. The upper case is electrically grounded and connected to the lower case. The optical engine is disposed in the lower case and located between the upper case and the lower case. The flexible sheet is fixed on the optical engine and contacts the upper case to release the noise to ground and reduce the electromagnetic interference (EMI) from the optical engine.

8 Claims, 4 Drawing Sheets

PROJECTOR WITH A FLEXIBLE SHEET TO REDUCE ELECTROMAGNETIC INTERFERENCE (EMI)

BACKGROUND OF THE INVENTION

1. Field of the Invention

The present invention relates to a projector, and in particular to a projector with a flexible sheet to reduce electromagnetic interference (EMI).

2. Description of the Related Art

As the size and weight of electronic devices have been reduced, Electromagnetic Interference (EMI) generated by electric components therein is worthy of consideration as it can inhibit the performance and possibly cause failure or damage to the device. Generally, Electromagnetic Interference (EMI) is generated by conductor wires embedded in the CPU, a power supply or by the printed circuit board (PCB). Therefore, it is important to discover a method of reducing EMI in electronic devices.

Referring to FIG. 1, FIG. 1 is a perspective diagram of a conventional projector. A lens set 3 and an optical engine 2 are connected and disposed inside the lower case 1 of the conventional projector. The optical image generated from the optical engine 2 is magnified through the lens set 3 and projected onto a screen. Moreover, the projector is covered by joining an upper case (not shown) to the lower case 1 to protect all the components inside.

As noise from compact conductor wires and PCBs collected in the optical engine 2, serious EMI may occur. The conventional projector typically utilizes a ground wire connected to the lower case 1 to disperse the noise. The conventional projector, however, utilizes only the lower case 1 to disperse the noise without passing through the upper case (not shown) directly. Thus, the lower case 1 has a greater noise load with respect to the upper case such that the noise cannot be evenly dispersed to the ground and EMI cannot be efficiently reduced.

To address the disadvantage of the conventional projector mentioned above, the present invention provides a projector with a flexible sheet to efficiently reduce electromagnetic interference (EMI).

SUMMARY OF THE INVENTION

An object of the invention is to provide a projector with a flexible sheet to reduce electromagnetic interference (EMI).

The projector has an upper case, a lower case, an optical engine and at least a flexible sheet. The upper case is electrically grounded and connected to the lower case. The optical engine is disposed in the lower case and located between the upper case and the lower case. The flexible sheet is fixed on the optical engine and contacts the upper case to disperse noise to the ground, thus reducing electromagnetic interference (EMI) from the optical engine.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
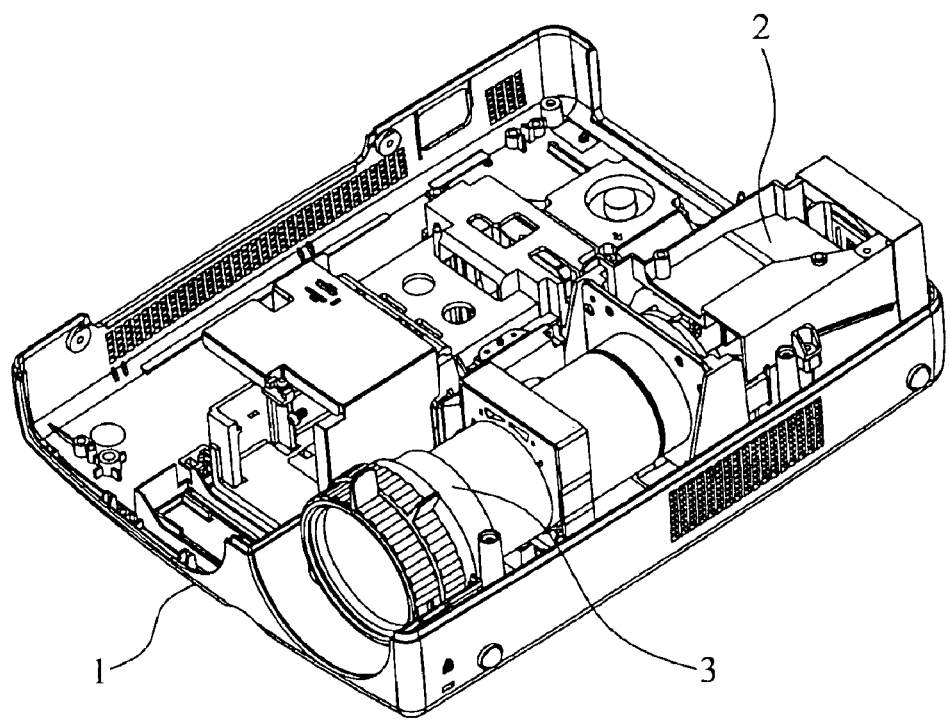
FIG. 1 is a perspective diagram of a conventional projector.
Figure 2:
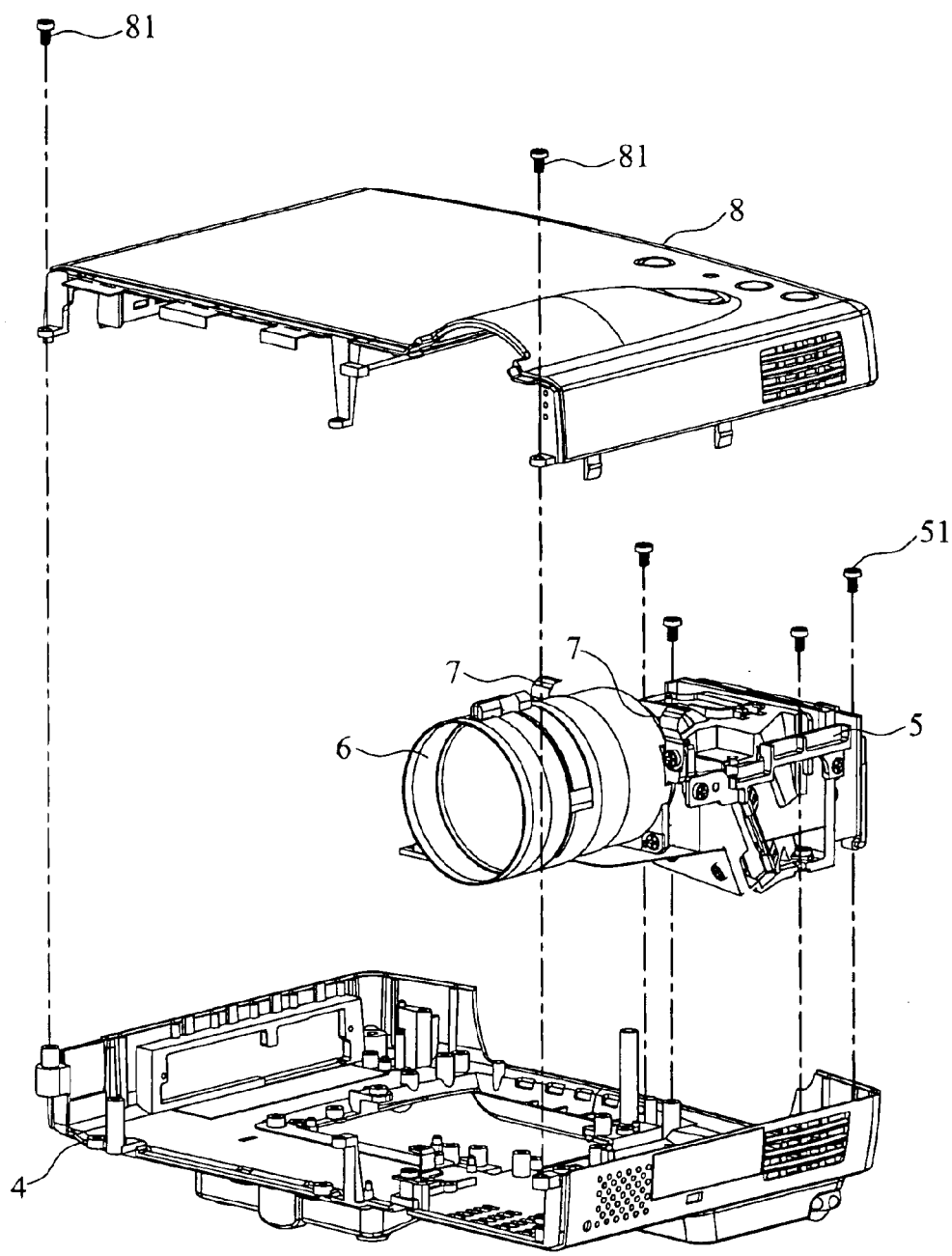
FIG. 2 is an exploded diagram of the projector with a flexible sheet to reduce electromagnetic interference (EMI) in accordance with the present invention.

Referring to FIG. 2, the projector with a flexible sheet to reduce electromagnetic interference (EMI) in accordance with the present invention has a lower case 4, an upper case 8, an optical engine 5, a lens set 6 and at least a flexible sheet 7. As shown in FIG. 2, the optical engine 5 is fixed to the lower case 4 and located between the lower case 4 and the upper case 8. Furthermore, the optical engine 5 is connected to the lens set 6 and fastened to the lower case 4 by the screws 51. The lower case 4 and the upper case 8 are joined by the screws 81 to cover the optical engine 5 and the lens set 6.

Particularly, the lower case 4 is electrically grounded by connecting a ground wire or power wire (not shown) to the ground. The upper case 8 is also electrically grounded by connecting the lower case 4 such that the noise of the upper case 8 can be transmitted to the lower case 4. In FIG. 2, moreover, two flexible sheets 7 are disposed on the optical engine 5 such that the flexible sheets 7 contact the upper case 8 directly. Therefore, the noise from the optical engine 5 can be efficiently and evenly dispersed not only via the lower case 4 but also transmitted through the upper case 8 directly by the flexible sheets 7.

Figure 3:
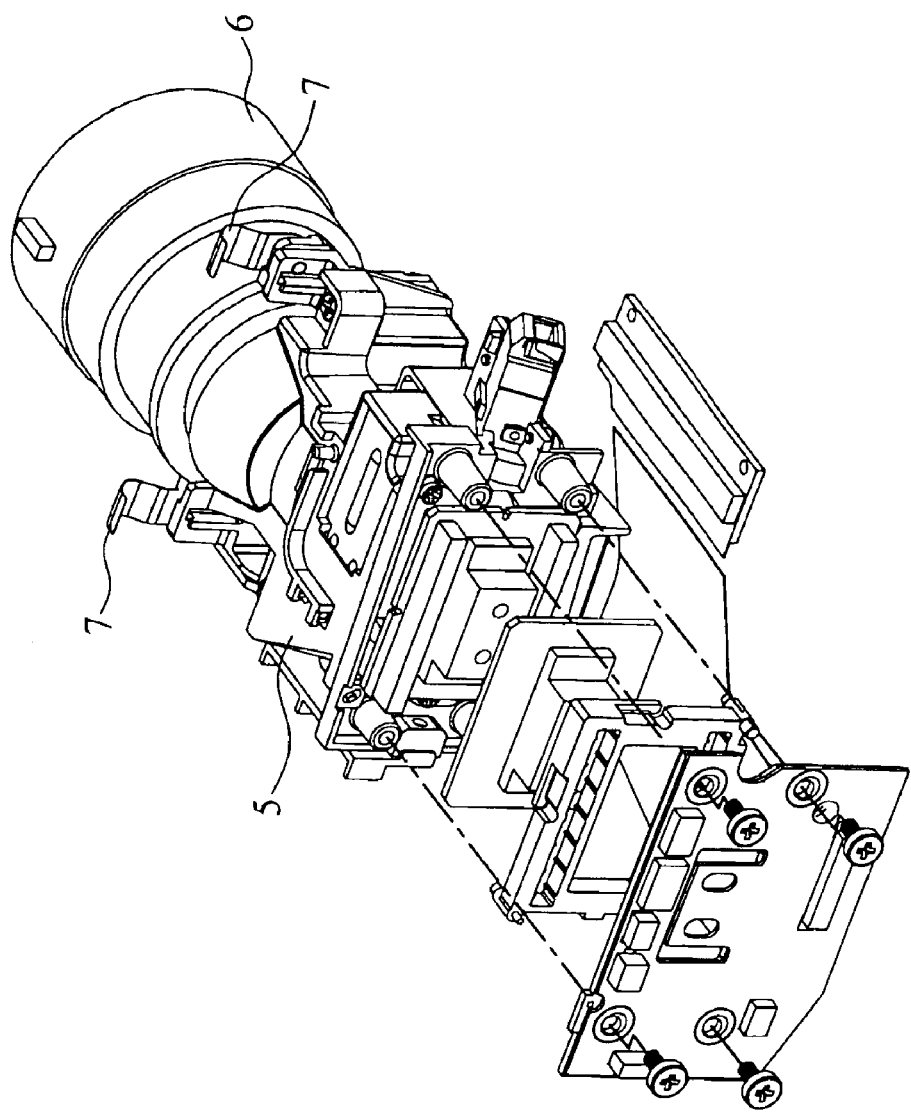
FIG. 3 is a perspective diagram of the optical engine with the flexible sheet thereon in accordance with the present invention.

FIG. 3 is a perspective diagram of the optical engine with the flexible sheets thereon in accordance with the present invention. As mentioned above, the flexible sheets 7 are disposed on the optical engine 5. Furthermore, in FIG. 3, the flexible sheets 7 are fixed on both sides near the border between the optical engine 5 and the lens set 6. As the flexible sheets 7 protrude upward, the upper case 8 is conducted to the optical engine 5 inside the projector by contacting the flexible sheets 7. Thus, the noise from the optical engine 5 can be directly guided to the upper case 8 via the flexible sheets 7.

As mentioned above, the flexible sheets 7 are utilized as the connector between the optical engine 5 and the upper case 8. Referring to FIG. 4a, the flexible sheet 7 has a hole 71, a curved portion 72 and a contacting portion 73. The contacting portion 73 is at the end of the curved portion 72 to contact the upper case 8. The flexible sheet 7 is fixed on the optical engine 5 by screws through the hole 71 such that the flexible sheet 7 protrudes to contact the upper case 8 (as shown in FIG. 2).

Additionally, the flexible sheet 7 of the present invention can be beryllium-copper alloy or any other conductive material. The curved portion 72 of the flexible sheet 7 is hook-shaped to enhance flexibility such that the flexible sheet 7 effectively contacts the upper case 8. Thus, noise from the optical engine 5 inside the projector can be guided to the ground through the upper case 8 directly by the flexible sheets 7.

Figure 4B:
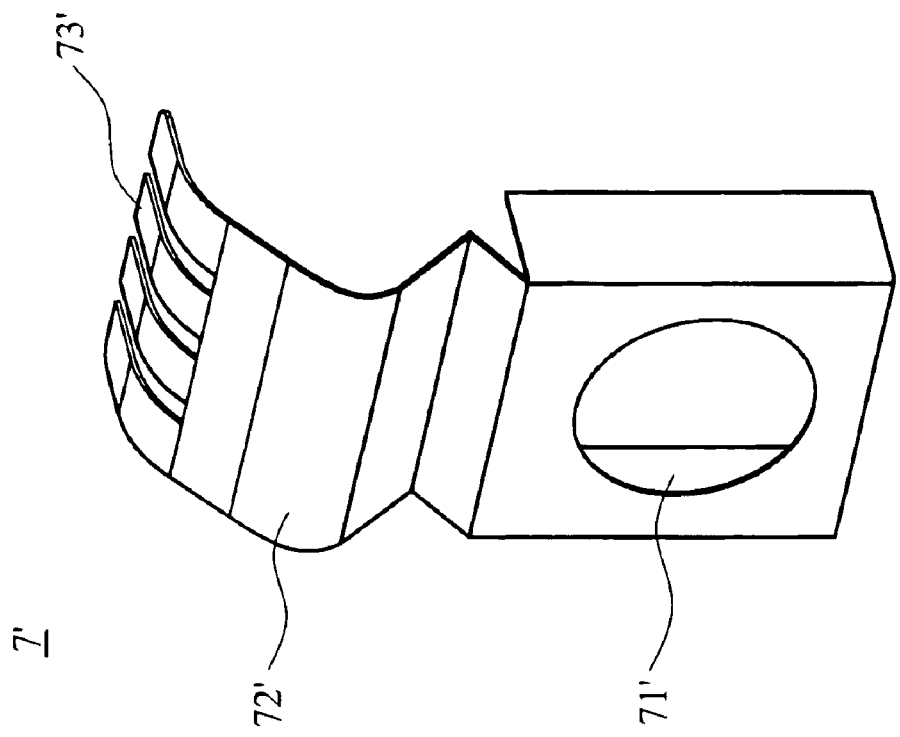
FIG. 4b is another embodiment of the flexible sheet in accordance with the present invention.
Figure 4A:
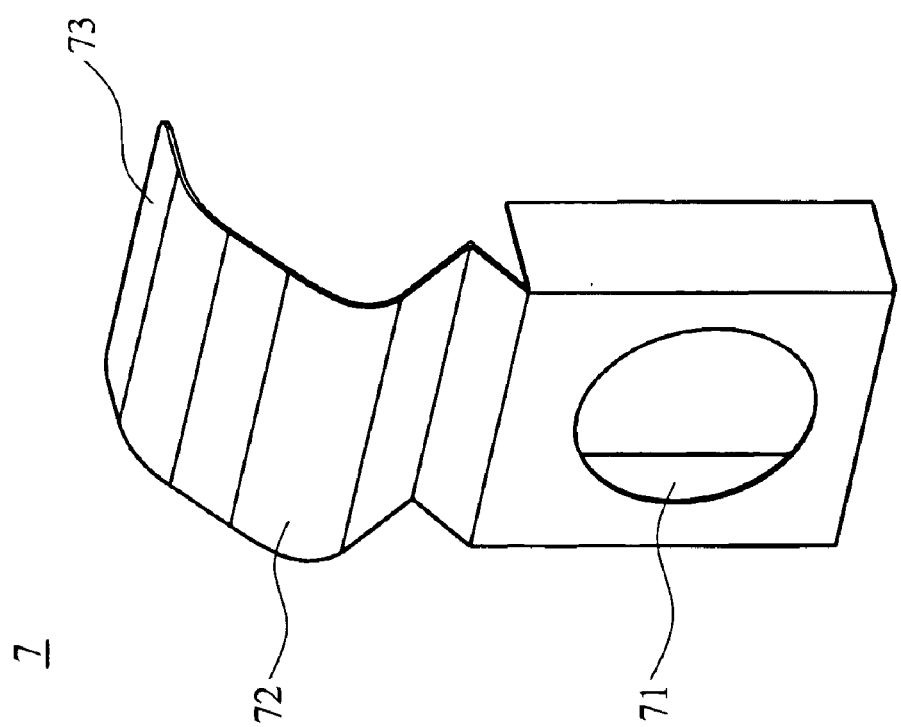
FIG. 4a is a perspective diagram of the flexible sheet in accordance with the present invention.

FIG. 4b is another embodiment of the flexible sheet in accordance with the present invention. Referring to FIG. 4b, the flexible sheet 7' has a hole 71', a curved portion 72' and a contacting portion 73'. The contacting portion 73' is at the end of the curved portion 72' to contact the upper case 8. The flexible sheet 7' is fixed on the optical engine 5 by a screw through the hole 71' such that the protruding flexible sheet 7 easily contacts the upper case 8. Particularly, in FIG. 4b, the curved portion 72 is hook-shaped and the contacting portion 73' is talon-shaped to avoid poor contact due to long-term usage.

In summary, a projector is provided with a flexible sheet to reduce electromagnetic interference (EMI) in accordance with the present invention. The noise from the optical engine inside the projector can be efficiently guided to the upper case via the protrusive flexible sheet. Instead of the conventional projector releasing the noise only through the lower case, EMI can be effectively reduced by simultaneously dispersing the noise to the ground through the upper case and lower case according to the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector with a flexible sheet to reduce electromagnetic interference, comprising:

a lower case;

an upper case electrically grounded and connected to the lower case;

an optical engine disposed between the upper case and the lower case, a flexible sheet contacting the optical engine and the upper case to release a noise of the optical engine to ground through the upper case.

2. The projector with a flexible sheet to reduce electromagnetic interference as claimed in claim 1, wherein the optical engine is fixed to the lower case.

3. The projector with a flexible sheet to reduce electromagnetic interference as claimed in claim 1, wherein the flexible sheet has a hole disposed thereon.

4. The projector with a flexible sheet to reduce electromagnetic interference as claimed in claim 1, wherein the flexible sheet is made of beryllium-copper alloy.

5. The projector with a flexible sheet to reduce electromagnetic interference as claimed in claim 1, wherein the flexible sheet has a curved portion contacting the upper case.

6. The projector with a flexible sheet to reduce electromagnetic interference as claimed in claim 5, wherein the curved portion is hook-shaped.

7. The projector with a flexible sheet to reduce electromagnetic interference as claimed in claim 5, wherein the flexible sheet further has a contact portion at the end of the curved portion to contact the upper case.

8. The projector with a flexible sheet to reduce electromagnetic interference as claimed in claim 7, wherein the contact portion is talon-shaped.

\* \* \* \* \*